United States Patent [19]
Otaki

[11] Patent Number: 5,619,613
[45] Date of Patent: Apr. 8, 1997

[54] HEATING CHAMBER WITH INSULATIVE SHIELD PANEL AND ELECTRIC HEATING PANELS MOUNTED ON GUARD FRAMES

[76] Inventor: Chizuko Otaki, 17-30, Kamitakaido 2-chome, Suginami-ku, Tokyo, Japan

[21] Appl. No.: 391,055

[22] Filed: Feb. 21, 1995

[30] Foreign Application Priority Data

Feb. 21, 1994 [JP] Japan .................................. 6-061932

[51] Int. Cl.⁶ .............................. A47J 39/02; F24C 7/04; F24C 15/34
[52] U.S. Cl. ........................ 392/437; 392/436; 392/416; 219/532; 219/537; 219/402; 219/411; 432/249
[58] Field of Search ..................................... 392/435–437, 392/432, 343, 416; 219/213, 201, 544, 526, 532, 537, 395, 402, 411; 432/249, 247, 226; 373/127, 128, 130

[56] References Cited

U.S. PATENT DOCUMENTS

| | | | |
|---|---|---|---|
| 3,057,989 | 10/1962 | Needham | 219/213 |
| 4,855,567 | 8/1989 | Mueller | 219/213 |
| 5,263,114 | 11/1993 | Tavernier | 392/437 |

FOREIGN PATENT DOCUMENTS

| | | | |
|---|---|---|---|
| 271886 | 6/1988 | European Pat. Off. | 392/435 |
| 288868 | 4/1928 | United Kingdom | 392/436 |
| 1047386 | 11/1966 | United Kingdom | 219/402 |

*Primary Examiner*—John A. Jeffrey
*Attorney, Agent, or Firm*—Ladas & Parry

[57] ABSTRACT

A heating chamber for maintaining processed foods warm for extended periods while not sacrificing food quality or causing a secular change in the chamber's insulating member. The heating chamber has side walls formed by outer and inner walls made of relatively high heat conducting material, an insulating member interposed between these walls, insulating paper interposed between the insulating member and one side of the inner walls, insulating shield panels mounted on the opposite side of the inner walls, each of the shield panels being a laminate of a second insulating member made of material such as styrene or urethane and a third insulating member made of material such as polyethylene, heater guard frames each presenting a flattened U-shaped cross-section, and a ceramic panel heater mounted on the inner side of each heater guard frame, wherein each of the heater guard frames is mounted on the chamber's inner wall such that each encloses a shield panel while maintaining an air gap between the shield panel and its associated ceramic panel heater. Heat emitted from the ceramic panel heater is transferred through the air gap, the shield panel, the inner wall of the chamber, the insulating paper and to the insulating member so that a thermal affection on this insulating member may be effectively alleviated. The ceramic panel in each heater guard frame is divided, if desired, into a plurality of sections which are in a column, thereby allowing the temperature within the heating chamber to be maintiained uniform.

2 Claims, 3 Drawing Sheets

HEATING CHAMBER WITH INSULATIVE SHIELD PANEL AND ELECTRIC HEATING PANELS MOUNTED ON GUARD FRAMES

BACKGROUND OF THE INVENTION

1. Technical Field

The present invention relates to a heating cabin used to maintain processed good warm for a long time without causing change in quality thereof.

2. Prior Art

Ready-made food articles such as box lunches or side dishes are usually cooked in food processing workshops in a time frame from midnight to early morning and delivered to supermarkets, convenience stores, general groceries, various jobsites or the like.

Such food articles are served usually after going through the process of cooking, cooling, transport, refrigeration, and heating. Such a process not only increases various costs but also disperses moisture content as well as original flavor from the food articles.

It is also well known to maintain food articles warm utilizing a heater or the like with the intention of preserving these articles for a long time. However, flavor and quality of the food articles inevitably change as time elapses and consequently these food articles are disposed after a predetermined time has elapsed.

Particularly in the case of side dishes, it has conventionally been considered the best measure that these articles should be maintained at a temperature of 80° C. or higher. However, such a measure has been found to be ineffective. The food articles maintained at this excessively high temperature lose freshness as well as flavor and correspondingly give offensive smell as the time elapses. As a result, these food articles have their commercial value significantly lowered.

Obviously, a so called heating chamber is necessary to perform such a measure of temporarily maintaining a box lunch or a ready-made side dish at a desired temperature. The conventional heating cabin typically employs glass wool as insulating material placed on respective side walls thereof. With this heating cabin of prior art, a temperature emitted from heat generator means must be as high as 135° C. to meet the requirement that the food articles should be maintained at a relatively high temperature, i.e., a temperature of 80° C. or higher as has previously been mentioned.

In the typical heating cabin of well known art, the heat generator means is mounted directly on the side walls and glass wool used as the insulating material is directly exposed to the above-mentioned excessively high temperature emitted from the heat generator means. The critical temperature glass wool can resist is on the order of 80° C., so this insulating material is deteriorated early due to the unacceptably high temperature.

Considering such state of art, the inventor has made studies on various aspects of the previously described problem and obtained therefrom findings as follows: The optimum temperature at which the food articles should be maintained in the heating cabin is from 63° C. to 68° C. The food articles are deteriorated in the heating chamber as the temperature exceeds 70° C. Specifically, moisture of each food article is evaporated first from the outer surface of each good article, which correspondingly loses its original humidity, leading to change in quality as well as loss of flavor. The thermal affection on the insulating material placed on the respective side walls of the cabin can be alleviated by properly selecting the placement of the heat generator means and by sufficiently increasing an amount of the insulating material.

It is unavoidable that more or less differential temperature appears in the vertical direction within the heating chamber. Sometimes an appropriate measure should be taken to compensate for this differential temperature, since a serious problem may result therefrom, depending on the type of food article to be handled.

Accordingly, it is a principal object of the invention to provide a heating chamber improved so that the temperature prevailing within the chamber can be maintained in the previously specified range, a secular change of the insulating material can be minimized and a useful life of the cabin can be prolonged as remarkably as possible.

It is another object of the invention to provide a heating cabin improved so that the differential temperature possibly appearing within the chamber can be minimized and thereby the temperature within the chamber can be maintained uniform.

SUMMARY OF THE INVENTION

The principal object set forth above is achieved, according to one aspect of the invention, by a heating chamber comprising: side walls each basically formed by outer and inner walls both made of material presenting relatively high heat conduction and an insulating member made of material such as glass wool and interposed between these outer and inner walls, insulating paper sandwiched between said insular member and said inner wall, shield panels each provided on the inner side of said inner wall, each of said shield panels comprising a laminate of another insulating member made of material such as styrene or urethane and still another insulating member made of material such as polyethylene, heater guard frames each presenting a flattened U-shaped cross-section, and ceramic panel heaters each mounted on the inner side of each heater guard frame, wherein each of said heater guard frames is mounted on the associated inner wall so that the associated one of said shield panels is enclosed thereby and an air gap is maintained between said shield panel and the associated ceramic panel heater.

The second object set forth above is achieved, according to another aspect of the invention, by a heating chamber wherein the ceramic panel heater on each side wall of the chamber is divided into a plurality of ceramic panel heater sections and mounted to the associated heater guard frame so as to be arranged in a column.

BRIEF DESCRIPTION OF THE DRAWINGS

The invention will be understood more specifically from the following description of the presently preferred embodiments made in reference with the accompanying drawings, in which.

DETAILED DESCRIPTION OF THE PREFERRED EMBODIMENTS

Figure 1:
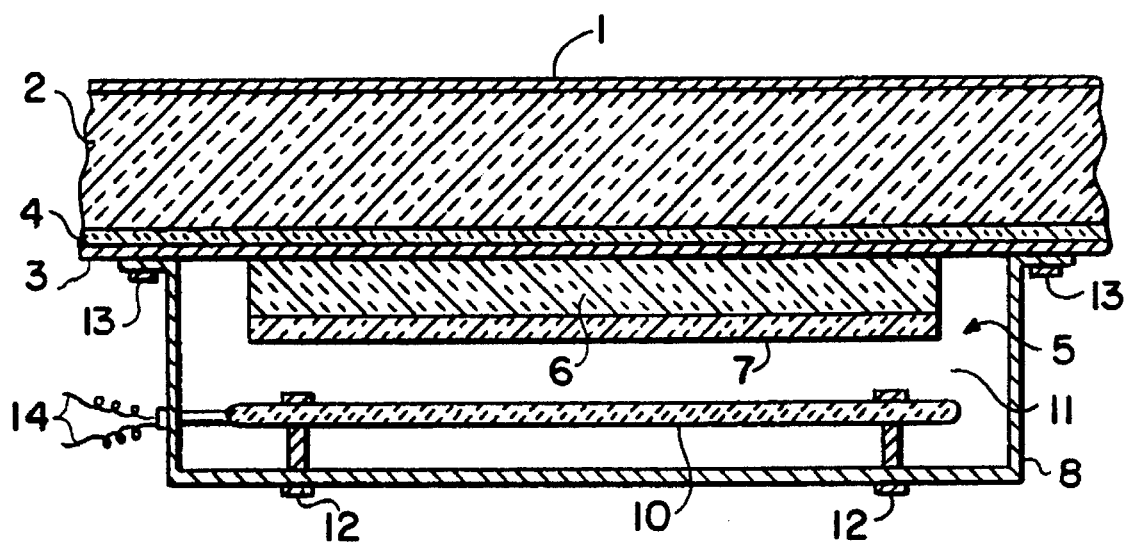
FIG. 1 is a sectional plan view showing important parts of the heating chamber according to the invention.
Figure 2:
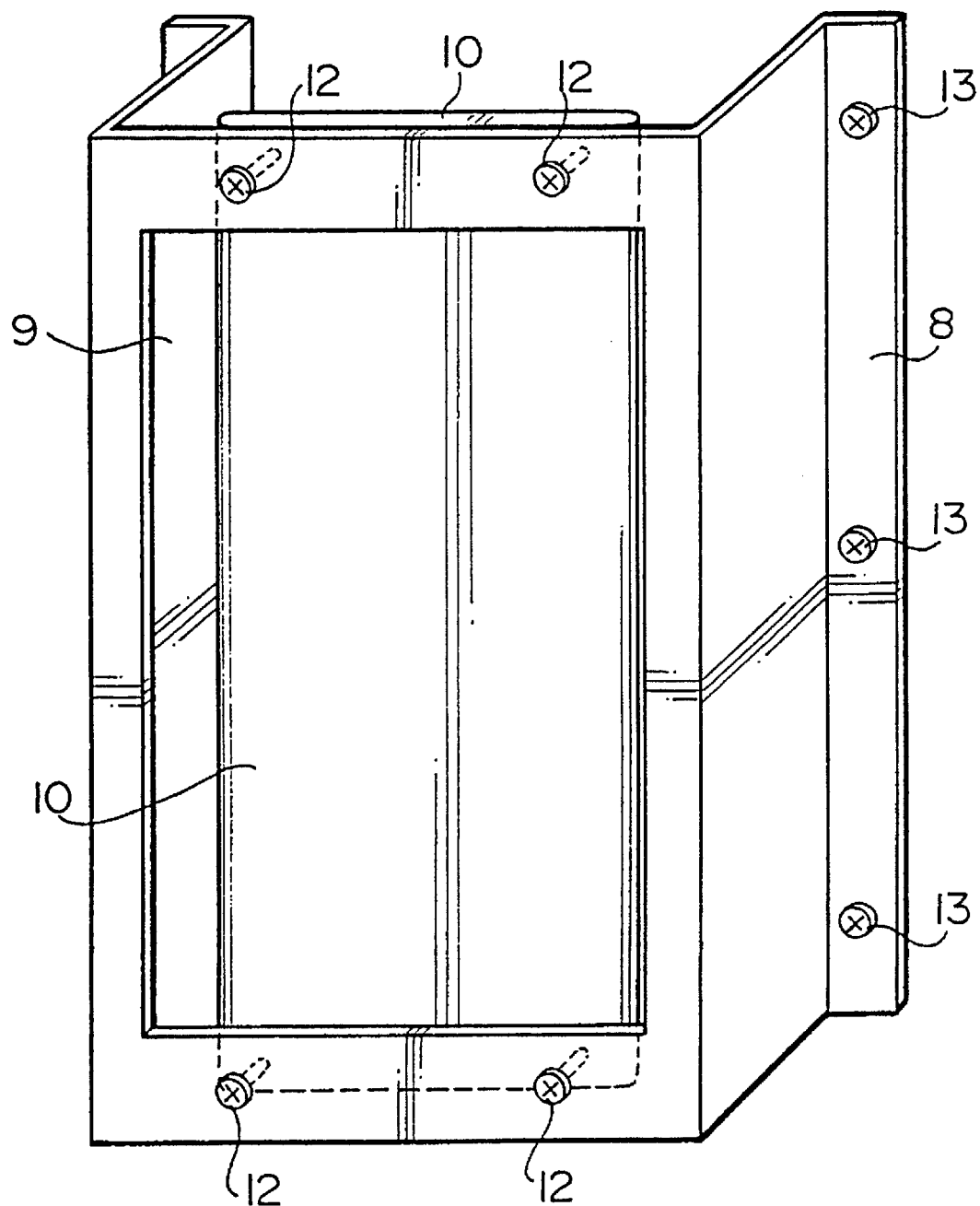
FIG. 2 is a perspective view showing the heater guard frame and the ceramic panel heater.
Figure 3:
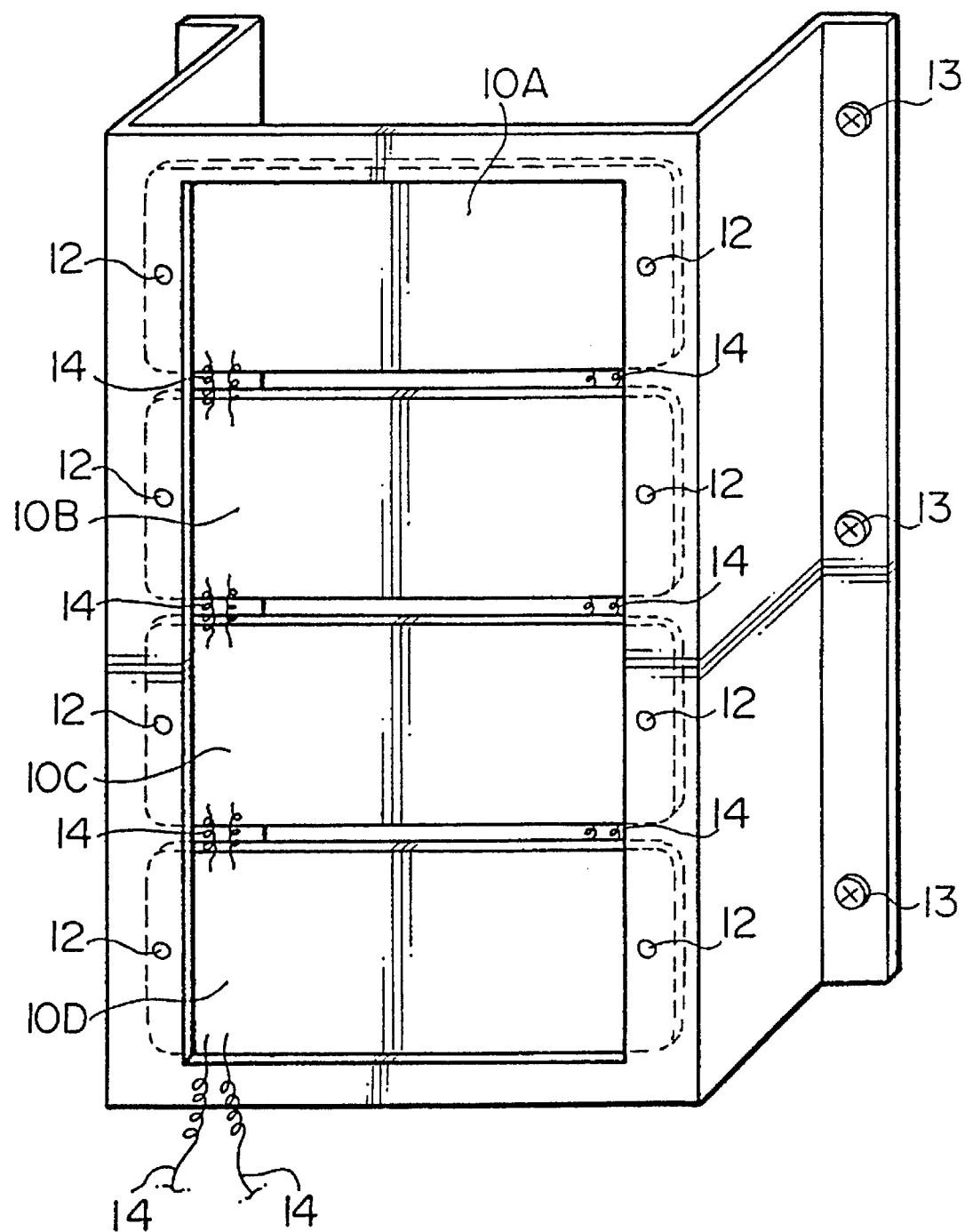
FIG. 3 is a view similar to FIG. 2 but showing an alternative arrangement of the heater guard frame and the ceramic panel heater.

Referring to FIGS. 1 and 2, reference numeral 1 designates an outer wall made from material presenting relatively high conduction such as stainless steel, reference numeral 3 designates an inner wall also made from material presenting relatively high heat conduction such as stainless steel, and reference numeral 2 designates insulating member made of material such as glass wool and interposed between said outer and inner walls 1, 3. Reference numeral 4 designates insulating paper sandwiched between said insulating member 2 and said inner wall 3, reference numeral 6 designates another insulating member made of material such as styrene or urethane, and reference numeral 7 designates still another insulating member made of material such as polyethylene. Laminate of said insulating members 6, 7 defines a shield panel 5 which is, in turn, mounted on said inner wall 3. Reference numeral 8 designates a heater guard frame having a flattened U-shaped in cross-section and an opening 9, and reference numeral 10 designates a ceramic panel heater mounted on the inner side of said heater guard frame 8 so that said ceramic panel heater 10 is opposed to said shield panel 5 leaving an air gap 11 therebetween. Reference numeral 12 designates set screws used to fix said heater 10 to said heater guard frame 8, reference numeral 13 designates set screws used to fix the heater guard frame 8 to the inner wall 3, and reference numeral 14 designates power supply cords for the ceramic panel heater 10. Referring to FIG. 3, reference numeral 10A, 10B, 10C, 10D designate divided sections of the ceramic panel heater.

With the heating chamber of the invention constructed as has been described above, upon energization of the ceramic panel heater 10, a temperature within the chamber progressively rises and then the temperature is controlled by a temperature controller (not shown) to be maintained at a predetermined level (from 63° C. to 68° C.). It will be readily appreciated in view of the inventive arrangement as has already been described that the heat emitted from the ceramic panel heater 10 is transferred through said shield panel 5, inner wall 3 and insulating paper 4 to the insulating member 2 and therefore any undesirable thermal affection on the insulating member 2 can be effectively alleviated. More specifically, the ceramic panel heater 10 is mounted on the inner side of the heater guard frame 8 which is, in turn, mounted on the inner wall 3, and the shield panel 5 comprising a laminate of the insulating member 6 made of material such as styrene or urethane and the other insulating member 7 made of material such as polyethylene is provided between said heater 10 and said inner walls 3 leaving the air gap 11 between said heater 10 and said shield panel 5. Additionally, the insulating paper 4 is sandwiched between the inner wall 3 and the insulating member 2.

When it is particularly desired to maintain the internal temperature of the chamber uniform, the ceramic panel heater to be mounted on the heater guard frame 8 is divided into a plurality of sections 10A, 10B, 10C, 10D so as to be arranged in a column and temperatures of the respective sections are controlled by the temperature controller, as shown by FIG. 3. In this way, the differential temperature possibly appearing in the vertical direction within the chamber can be minimized and thereby the temperature within the chamber can be maintained substantially uniform.

EXAMPLE 0.5 mm thick stainless steel sheet was used to form the outer and inner walls 1, 3, and 50 mm thick insulating member 2 of which the critical heat resistance is 80° C. was interposed between said outer and inner walls 1, 3. 2 mm thick insulating paper 4 was sandwiched between said insulating member 2 and said inner wall 3. 10 mm insulating member 6 made of urethane or styrene was laminated with 2 mm thick insulating member 7 made of polyethylene to form the shield panel 5 which was, in turn, mounted on the inner wall 3, and the heater guard frame 8 equipped with the ceramic panel heater 10 was placed so as to be spaced from said shield panel 5 by 10 mm. The ceramic panel heater 10 was energized for a period of 5 to 15 minutes. Approximately 6 minutes after start of energization, the temperature controller was actuated to maintain the temperature within the chamber at a temperature of 63° C. to 68° C. The temperature of the insulating member 2 at this moment was maintained at a temperature of 65° C. to 70° C. The undesirable affection on said insulating member 2 and therefore the secular change thereof due to the heat transferred from the ceramic panel heater 10 were effectively alleviated, and the useful life of the chamber was correspondingly prolonged.

Effect of the Invention

As will be appreciated from the foregoing description, the heat transferred from the ceramic panel heater to the insulating member interposed between the inner wall and the outer wall can be reduced by the inventive arrangement such that the ceramic panel heater serving as a heat source is not mounted directly on the inner wall but mounted on the heater guard frame, the shield panel is placed between the inner wall and the ceramic panel heater so as to leave an air gap between said shield panel and said heater guard frame, and the insulating paper is sandwiched between the insulating member bearing against the inner side of the outer wall and the inner wall. In this manner, it is possible to alleviate the secular change of the insulating member interposed between the outer and inner walls due to the heat transferred from the ceramic panel heater even when the critical heat resistance of said insulating member is on the order of 80° C. Correspondingly, the useful life of this insulating member and therefore of the heating chamber itself can be prolonged.

The ceramic panel heater mounted on the heater guard frame may be divided into a plurality of sections arranged in a column and temperatures of these sections are controlled, respectively. In this manner, a differential temperature possibly appearing in the vertical direction within the chamber can be effectively reduced and thereby food articles to be handled within the chamber can be prevented from uneven change in quality.

What is claimed is:

1. Heating chamber comprising side walls each basically formed by outer and inner walls both made of material presenting relatively high heat conduction, a first insulating member interposed between these outer and inner walls, insulating paper sandwiched between said insulating member and said inner wall, each of said shield panels including a laminate of a second insulating member and a third insulating member, heater guard frames, and ceramic panel heaters each mounted on the inner side of each heater guard frame, wherein each of said heater guard frames is mounted on the associated inner wall so that the associated one of said shield panels is enclosed thereby and an air gap is maintained between said shield panel and the associated ceramic panel heater.

2. Heating chamber according to claim 1, wherein the ceramic panel heater on each side of the heating chamber is divided into a plurality of sections and mounted to the associated heater guard frame so as to be arranged in a column.

\* \* \* \* \*